(12) United States Patent
Ahn et al.

(10) Patent No.: US 11,137,524 B2
(45) Date of Patent: Oct. 5, 2021

(54) HARD COATING FILM AND PREPARATION METHOD THEREOF

(71) Applicants: SK Innovation Co., Ltd., Seoul (KR); SK IE Technology Co., Ltd., Seoul (KR)

(72) Inventors: Jong Nam Ahn, Daejeon (KR); Keon Hyeok Ko, Daejeon (KR); Byoung Sun Ko, Daejeon (KR); Sang Yoon Park, Daejeon (KR); Jin Su Park, Daejeon (KR); Ho Chul Yoon, Daejeon (KR); Tae Sug Jang, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 0 days.

(21) Appl. No.: 16/700,129

(22) Filed: Dec. 2, 2019

(65) Prior Publication Data
US 2020/0174161 A1  Jun. 4, 2020

(30) Foreign Application Priority Data
Dec. 3, 2018  (KR) .......................... 10-2018-0153434

(51) Int. Cl.
| | | |
|---|---|---|
| *G02B 1/14* | (2015.01) | |
| *C08G 73/14* | (2006.01) | |
| *C09D 183/06* | (2006.01) | |
| *C08G 77/00* | (2006.01) | |
| *C08J 7/046* | (2020.01) | |

(Continued)

(52) U.S. Cl.
CPC .............. *G02B 1/14* (2015.01); *C08G 73/14* (2013.01); *C08G 77/18* (2013.01); *C08J 7/046* (2020.01); *C08J 7/0427* (2020.01); *C09D 183/06* (2013.01); *C08G 77/80* (2013.01); *C08J 2379/08* (2013.01); *C08J 2483/06* (2013.01)

(58) Field of Classification Search
CPC ........... G02B 1/14; C08G 73/10–73/14; C09D 183/04–183/16
See application file for complete search history.

(56) References Cited

U.S. PATENT DOCUMENTS

| | | | |
|---|---|---|---|
| 9,706,649 B2 | 7/2017 | Jung et al. | |
| 2015/0159044 A1* | 6/2015 | Bae | .................... C08G 59/3281 523/435 |

(Continued)

FOREIGN PATENT DOCUMENTS

| | | |
|---|---|---|
| JP | 200596298 A | 4/2005 |
| JP | 200746031 A | 2/2007 |

(Continued)

OTHER PUBLICATIONS

Wood, R.W. "The Invisibility of Transparent Objects", Phys. Rev. Series I, vol. 15, Issue 2, (1902); pp. 123-124.*

*Primary Examiner* — Prashant J Khatri
(74) *Attorney, Agent, or Firm* — The Webb Law Firm

(57) ABSTRACT

Provided is a hard coating film including a polyamideimide substrate layer and a hard coating layer, each of which has a predetermined refractive index, with a difference in the refractive index between those layers being 0.05. The substrate layer has a tensile modulus of 3 to 7 GPa, at a thickness of 80 μm, as measured according to ASTM D111. The present invention relates to a hard coating film having improved mechanical and optical properties.

11 Claims, 2 Drawing Sheets

(51) Int. Cl.
  *C08J 7/04* (2020.01)
  *C08G 77/18* (2006.01)

(56) References Cited

U.S. PATENT DOCUMENTS

2016/0185926 A1\* 6/2016 Song ...................... C08J 7/0427
                                                              428/337
2016/0319076 A1\* 11/2016 Ju .......................... C08G 73/14

FOREIGN PATENT DOCUMENTS

JP   WO2018037488 A1   8/2018
KR   1020130074167 A   7/2013

\* cited by examiner

HARD COATING FILM AND PREPARATION METHOD THEREOF

CROSS-REFERENCE TO RELATED APPLICATION

This application claims priority to Korean Patent Application No. 10-2018-0153434 filed Dec. 3, 2018, the disclosure of which is hereby incorporated by reference in its entirety.

TECHNICAL FIELD

The following disclosure relates to a hard coating film and a preparation method thereof. More particularly, the present following disclosure relates to hard coating film including a substrate layer and a hard coating layer, and a preparation method thereof.

BACKGROUND

Recently, thin displays using a flat panel display such as an organic light emitting diode display or a liquid crystal display are drawing attention. Particularly, these thin displays are implemented in the form of a touch screen panel and are widely used in various smart devices characterized by portability including various wearable devices as well as smart phones and tablet PCs.

These portable touch screen panel-based displays are provided with a window cover for display protection on a display panel for protecting the display panel from scratches or external impact, and in most cases, tempered glass for a display is used as a window cover. A tempered glass for a display is thinner than general glass, but is characterized by being manufactured to have high strength together with resistance to scratches.

However, the tempered glass has a disadvantage of being not suitable for weight reduction of portable devices due to its heavy weight, is vulnerable to external shock so that it is difficult to implement an unbreakable property, and does not bend above a certain level so that the tempered glass is unsuitable as a flexible display material having a bendable or foldable function.

Recently, various studies on an optical plastic cover securing flexibility and impact resistance simultaneously with having strength or scratch resistance corresponding to tempered glass have been conducted. In general, examples of optical transparent plastic cover materials having flexibility as compared with tempered glass may include polyethylene terephthalate (PET), polyether sulfone (PES), polyethylene naphthalate (PEN), polyacrylate (PAR), polycarbonate (PC), polyimide (PI), polyaramide (PA), polyamideimide (PAI), and the like.

However, these polymer plastic substrates exhibit insufficient physical properties in terms of hardness and scratch resistance and also does not have sufficient impact resistance, as compared with tempered glass used as a window cover for display protection. Thus, various attempts for complementing the required physical properties by coating a composite resin composition on these plastic substrates, have been made. As an example, Korean Patent Laid-Open Publication No. 10-2013-0074167 discloses a plastic substrate.

In the case of a general hard coating, a composition including a resin containing a photocurable functional group such as (meth)acrylate or epoxy, a curing agent or a curing catalyst, and other additives is used, but it is difficult to implement high hardness corresponding to the tempered glass, a curling phenomenon occurs a lot due to shrinkage at the time of curing, and also flexibility is insufficient, and thus, the general hard coating has a disadvantage of being not appropriate as a protective window substrate for being applied to a flexible display.

RELATED ART DOCUMENTS

Korean Patent Laid-Open Publication No. 10-2013-0074167

SUMMARY

An embodiment of the present invention is directed to providing a hard coating film having improved mechanical and optical properties.

Another embodiment of the present invention is directed to providing a preparation method of a hard coating film having improved mechanical and optical properties.

In one general aspect, a hard coating film includes: a polyamideimide substrate layer having a refractive index of 1.51 to 1.57; and a hard coating layer having a refractive index of 1.49 to 1.54, disposed on at least one surface of the substrate layer, wherein the substrate layer has a tensile modulus of 3 to 7 GPa, at a thickness of 80 μm, as measured according to ASTM D111, and a difference in the refractive index between the substrate layer and the hard coating layer is 0.05 or less.

In exemplary embodiments, the substrate layer may have a light transmittance at 388 nm of 75% or less.

In exemplary embodiments, the substrate layer may have a yellow index of 3 or less, at the thickness of 80 μm.

In exemplary embodiments, a difference in the refractive index may be 0.02 or less.

In exemplary embodiments, the substrate layer may include a polyamideimide resin formed by copolymerizing (a) an aromatic diamine compound, (b) a dianhydride compound, and (c) an aromatic dicarboxylic acid compound or a derivative thereof.

In exemplary embodiments, the (a) aromatic diamine compound may include a fluorine-substituted aromatic diamine compound.

In exemplary embodiments, the (b) dianhydride compound may include a dianhydride compound containing an aromatic ring and a dianhydride compound containing an aliphatic ring.

In exemplary embodiments, the (c) aromatic dicarboxylic acid compound or the derivative thereof may include a terephthaloyl dichloride or isoterephthaloyl dichloride.

In exemplary embodiments, the hard coating layer may include an epoxysilane resin.

In exemplary embodiments, the epoxysilane resin may include a cured product of 2-(3,4-epoxycyclohexyl) ethyltrimethoxysilane.

In exemplary embodiments, the epoxysilane resin may include a cured product of 2-(3,4-epoxycyclohexyl)ethyltrimethoxysilane and trimethoxyphenylsilane.

In another general aspect, a preparation method of a hard coating film includes: forming a polyamideimide substrate layer having a refractive index of 1.51 to 1.57; and forming a hard coating layer having a refractive index of 1.49 to 1.54 on at least one surface of the substrate layer, a difference in the refractive index between the substrate layer and the hard coating layer being 0.05 or less, wherein the substrate layer has a tensile modulus of 3 to 7 GPa, at a thickness of 80 μm, as measured according to ASTM D111.

In exemplary embodiments, the substrate layer may be formed of a polyamideimide resin formed by copolymerizing 2,2'-bis(trifluoromethyl)benzidine, 4,4'-(hexafluoroisopropylidene)diphthalic anhydride, cyclobutanetetracarboxylic dianhydride, terephthaloyl dichloride, and isoterephthaloyl dichloride.

In exemplary embodiments, the hard coating layer may be formed of an epoxysilane resin.

Other features and aspects will be apparent from the following detailed description, the drawings, and the claims.

DETAILED DESCRIPTION OF MAIN ELEMENTS

10: Hard coating film
100: Substrate layer
110: Hard coating layer

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the present invention provide a hard coating film including a polyamideimide substrate layer and a hard coating layer, each of which has a predetermined refractive index, a difference in the refractive index between those layers being 0.05 or less, and a preparation method of the hard coating film, in which the substrate layer has a tensile modulus of 3 to 7 GPa, at a thickness of 80 μm, as measured according to ASTM D111. That is, a hard coating film having improved mechanical and optical properties is provided.

Hereinafter, the exemplary embodiments of the present invention will be described in detail. However, these are only illustrative, and the present invention is not limited to the specific embodiments which are illustratively described by the present invention.

Figure 1:
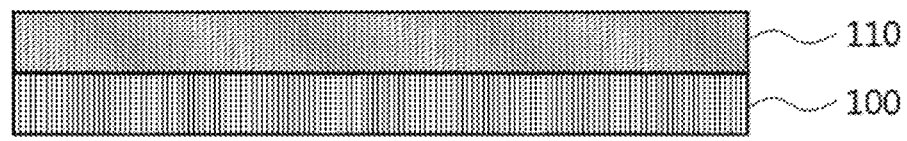
FIG. 1 is a schematic drawing illustrating a hard coating film according to exemplary embodiments of the present invention.

FIG. 1 is a schematic drawing illustrating a hard coating film according to exemplary embodiments of the present invention.

Referring to FIG. 1, the hard coating film 10 according to the exemplary embodiments may include a substrate layer 100 and a hard coating layer 110.

The substrate layer 100 may include a polyamideimide resin. In some exemplary embodiments, the substrate layer 100 may be formed of the polyamideimide resin alone.

The polyamideimide substrate layer 100 may have a refractive index of 1.51 to 1.57. When the refractive index is less than 1.51, an addition amount of diamine or dianhydride having an aliphatic structure having a relatively low refractive index, among the monomers forming the polyamideimide resin, should be increased, and in this case, mechanical strength, in particular, a modulus of the polyamideimide film, may be decreased. When the refractive index is 1.57 or more, an addition amount of the aromatic compound having a high refractive index, among the monomers forming the polyamideimide resin, needs to be increased, and in this case, optical physical properties, in particular, a yellow index of the polyamideimide film, may be increased.

For example, a difference in the refractive index between the substrate layer and the hard coating film 110 may be decreased in the range of the refractive index. Therefore, occurrence of an interference fringe due to a difference in the refractive index between layers of the hard coating film 10 may be effectively decreased.

The polyamideimide substrate layer 100 may have a tensile modulus of 3 to 7 GPa, at a thickness of 80 μm, as measured according to an ASTM D111 method. Accordingly, the hard coating layer 110 may be flexibly supported, and a pencil hardness of the hard coating film 10 may be improved. For example, when the tensile modulus is less than 3 GPa, the pencil hardness of the hard coating film 10 may be decreased.

A thickness of the substrate layer 100 may be, for example, 10 to 250 μm, but is not limited thereto.

In the exemplary embodiments, the polyamideimide resin layer may include a copolymer of (a) an aromatic diamine compound, (b) a dianhydride compound, and (c) an aromatic dicarboxylic acid compound or a derivative thereof. For example, the compound (a) and the compound (b) may be polymerized to form an imide bond. In addition, the compound (a) and the compound (c) may be polymerized to form an amide bond. The imide bond may be formed by a condensation reaction of an amine group and a dianhydride group. The amide bond may be formed by a condensation reaction of an amine group and a carboxyl group or a derivative thereof. The compounds (a) to (c) may be connected to each other by the imide bond or the amide bond to form the polyamideimide resin.

In some exemplary embodiments, polymerization of the compound (a) and the compound (b) may be performed via two steps. For example, one amine group of the compound (a) and one anhydride of the compound (b) may be primarily reacted to form an amic acid group. In addition, the amic acid may form an imide group by an additional reaction. For the two-step reaction, the amine group of the compound (a) may be a primary amine group.

In some exemplary embodiments, the compound (a) may include a fluorine-substituted aromatic diamine compound. The fluorine-substituted aromatic diamine compound may improve optical properties of the polyamideimide resin, since the fluorine substituent functions as an electron withdrawing group. For example, a light transmittance of the polyamideimide film may be improved and a yellow index may be improved. In addition, a tensile modulus of the polyamideimide resin may be improved to improve mechanical strength of the hard coating film. The fluorine-substituted aromatic diamine compound may include, for example, 2,2'-bis(trifluoromethyl)benzidine and the like. In some exemplary embodiments, as the compound (a), 2,2'-bis(trifluoromethyl)benzidine may be used alone.

In some exemplary embodiments, the (b) dianhydride compound may include a dianhydride compound containing an aromatic ring or a dianhydride compound containing an aliphatic ring. The dianhydride compound containing an aromatic ring may improve the optical properties (for example, transmittance) of the polyamideimide resin. The dianhydride compound containing an aliphatic ring may improve the mechanical properties (for example, a modulus of elasticity or a tensile modulus) of the polyamideimide resin.

For example, the dianhydride compound containing an aromatic ring may be 4,4'-(hexafluoroisopropylidene)diphthalic anhydride (6FDA), 1,2,4,5-benzenetetracarboxylic dianhydride (PMDA), biphenyl tetracarboxylic dianhydride (BPDA), benzophenonetetracarboxylic dianhydride (BTDA), 4,4'-oxydiphthalic dianhydride (ODPA), and bis-dicarboxyphenoxy diphenyl sulfide dianhydride (BDSDA), and the like, alone or in combination of two or more. Compounds such as 4,4'-(hexafluoroisopropylidene)diphthalic anhydride (6FDA) may contain an electron withdrawing group such as fluorine, thereby improving the optical properties of the polyamideimide resin.

For example, the dianhydride compound containing an aliphatic ring may be one or more selected from the group consisting of 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclooxtene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride, 1,2,3,4-tetracarboxycyclopentane dianhydride, and the like. Preferably, 1,2,3,4-cyclobutanetetracarboxylic dianhydride (CBDA) may be used.

The dianhydride compound containing an aliphatic ring may be used separately from the dianhydride compound containing an aromatic ring. Preferably, the dianhydride compound containing an aliphatic ring and the dianhydride compound containing an aromatic ring may be used together.

In addition, the dianhydride compound containing an aromatic ring may be used at 2 to 20 mol, preferably 3 to 15 mol, based on 100 mol of the aromatic diamine.

In addition, the dianhydride compound containing an aliphatic ring may be used at 5 to 60 mol, preferably 20 to 50 mol, based on 100 mol of the aromatic diamine.

The (c) aromatic dicarboxylic acid compound or the derivative thereof may include a compound in which benzene, biphenyl or naphthalene is substituted with two carboxylic acid groups or derivatives of the carboxylic acid group. The derivative of the carboxylic acid group may include an acid chloride group (—COCl). Preferably, an aromatic compound substituted with two acid chloride groups (aromatic diacid dichloride) may be used for an effective polymerization reaction.

For example, the aromatic diacid dichloride may be terephthaloyl dichloride (TPC), isophthaloyl dichloride (IPC), [1,1'-biphenyl]-4,4'-dicarbonyl dichloride (BPC), 1,4-naphthalenedicarboxylic dichloride, 2,6-naphthalenedicarboxylic dichloride, 1,5-naphthalenedicarboxylic dichloride, and the like, alone or in combination of two or more. In this case, a light transmittance in visible and ultraviolet regions may be improved, and a yellow index may be decreased. Preferably, terephthaloyl dichloride or isophthaloyl dichloride may be used, and it is more preferred to use terephthaloyl dichloride and isophthaloyl dichloride together, in terms of adjusting the tensile modulus.

Conventionally, when the compound (c) is used at 50 mol or more, based on 100 mol of the aromatic diamine, problems such as gelation arose.

According to the exemplary embodiments of the present invention, the compound (c) may be used with the compound (b). Thus, the compound (c) may be used at 50 mol or more, based on 100 mol of the aromatic diamine, while the gelation is prevented. Accordingly, the modulus and the optical properties of the polyamideimide film may be improved.

The compound (c) may be used at 50 to 90 mol, preferably 50 to 80 mol, based on 100 mol of the aromatic diamine.

According to the exemplary embodiments, the kind and ratio of the monomer of the polyamideimide are adjusted, whereby the film formed by the polyamideimide resin may have a refractive index satisfying a range of 1.51 to 1.57, and may have a tensile modulus satisfying 3 to 7 GPa, at a thickness of 80 μm, as measured according to ASTM D111. For example, the ratios of the compounds (a) to (c) may be adjusted in the above-described content range to implement the desired refractive index and tensile modulus.

In some exemplary embodiments, an equivalent ratio of a mixture of the compounds (b) and (c) and the compound (a) may include 1:0.9 to 1:1.1. When the above range is satisfied, the polyamideimide film may be effectively formed.

In the exemplary embodiments, the polyamideimide resin may be formed from a composition for forming polyamideimide. The composition for forming polyamideimide may include one or more of the compounds (a) to (c).

In some exemplary embodiments, the composition for forming polyamideimide may include a solvent. The solvent may include a polar organic solvent. The organic solvent may be dimethylacetamide (DMAc), N-methyl-2-pyrrolidone (NMP), dimethylformamide (DMF), dimethylformsulfoxide (DMSO), acetone, diethylacetate, m-cresol, and the like, alone or in combination.

In some exemplary embodiments, the composition for forming polyamideimide may include an imidization catalyst or a dehydrating agent.

The imidization catalyst may include one or two or more of pyridine, isoquinoline and β-quinoline. In addition, as the dehydrating agent, one or two more selected from the group consisting of an acetic anhydride, a phthalic anhydride and a maleic anhydride may be used.

In some exemplary embodiments, the composition for forming a polyamideimide may further include an additive. The additive may include one or two or more selected from the group consisting of a flame retardant, an adhesive strength enhancer, inorganic particles, an antioxidant, a sunscreen, a plasticizer, an antistatic agent, and the like.

In the exemplary embodiments, the substrate layer 100 may have a light transmittance at 388 nm of 75% or less. Accordingly, light in an ultraviolet region, passing through the hard coating film may be blocked.

The hard coating layer 110 may be disposed on at least one surface of the substrate 100. For example, the hard coating layer may be disposed on an upper surface of the substrate layer 100, or may be disposed on each of the upper and lower surfaces of the substrate layer 100. The hard coating layer 110 may protect the substrate layer 100 having excellent optical and mechanical properties from external physical and chemical damage.

The hard coating layer 110 may have a refractive index of 1.49 to 1.54. In the range of the refractive index, a difference in the refractive index between the hard coating layer 110 and the substrate layer 100 may be decreased. Therefore, occurrence of an interference fringe due to a difference in the optical properties between each layer of the hard coating film 10 may be suppressed.

The difference in the refractive index between the hard coating layer 110 and the substrate layer 100 may be 0.05 or less. When the difference in the refractive index is 0.05 or less, occurrence of an interference fringe due to a difference in the optical properties between each layer of the hard coating film 10 may be significantly decreased. More preferably, the difference in the refractive index may be 0.02 or less.

According to some exemplary embodiments, the hard coating layer 110 may include an epoxysilane resin. For example, the hard coating layer 110 may be formed from a composition for forming a hard coating layer including an epoxy siloxane resin.

The epoxy siloxane resin may be, for example, a siloxane resin including an epoxy group. The epoxy group may be any one or more selected from the group consisting of a cyclic epoxy group, an aliphatic epoxy group, and an aromatic epoxy group. The siloxane resin may refer to a polymer compound in which a silicon atom and an oxygen atom form a covalent bond.

In some exemplary embodiments, the epoxy siloxane resin may be an epoxy group-substituted silsesquioxane resin. For example, the epoxy siloxane resin may be that in which the silicon atom of the silsesquioxane resin is directly substituted by an epoxy group or the substituent on the silicon atom is substituted by an epoxy group. As a non-limiting example, the epoxy siloxane resin may be a silsesquioxane resin substituted by a 2-(3,4-epoxycyclohexyl) group or a 3-glycidoxy group.

According to some exemplary embodiments, the epoxy siloxane resin may have a weight average molecular weight of 1,000 to 20,000, more preferably 1,000 to 18,000, and more preferably 2,000 to 15,000. When the weight average molecular weight is within the above range, the composition for forming a hard coating layer may have more appropriate viscosity. Thus, the flowability, coatability, curing reactivity, and the like of the composition for forming a hard coating layer may be further improved. In addition, the hardness of the hard coating layer may be further improved and the flexibility of the hard coating layer is improved, thereby further suppressing occurrence of curling.

The epoxy siloxane resin according to the present invention may be prepared by hydrolysis and a condensation reaction of alkoxysilane having an epoxy group alone or between alkoxysilane having an epoxy group and another kind of alkoxysilane, in the presence of water.

The alkoxysilane having an epoxy group may include, for example, 2-(3,4-epoxycyclohexyl)ethyltrimethoxysilane, 2-(3,4-epoxycyclohexyl)ethyltriethoxysilane, 3-glycidoxypropyltrimethoxysilane, and the like. These may be used alone or in combination of two or more.

In some exemplary embodiments, the epoxy siloxane resin may be included at 20 to 70 parts by weight, based on 100 parts by weight of the composition for forming a hard coating layer. More preferably, the epoxy siloxane resin may be included at 20 to 50 parts by weight, based on 100 parts by weight of the composition for forming a hard coating layer. When the above range is satisfied, the composition for forming a hard coating layer may secure better flowability and coating property. In addition, uniform curing is possible at the time of curing the composition for forming a hard coating layer, so that physical defects such as cracks due to overcuring may be more effectively prevented. In addition, the hard coating layer may represent better hardness.

In some exemplary embodiments, the composition for forming a hard coating layer may further include a crosslinking agent. The crosslinking agent may form crosslinks with the epoxy siloxane resin to solidify the composition for forming a hard coating the cured layer and to improve the hardness of the hard coating layer.

According to some exemplary embodiment, the crosslinking agent may include a compound having an alicyclic epoxy group. For example, the crosslinking agent may include a compound in which two 3,4-epoxycyclohexyl groups are connected. More specifically, for example, the crosslinking agent may include a compound represented by the following Chemical Formula 1. The crosslinking agent may have similar structure and characteristics to those of the epoxy siloxane resin. In this case, the crosslinking of the epoxy siloxane resin is promoted, and the composition may be maintained at a proper viscosity.

[Chemical Formula 1]

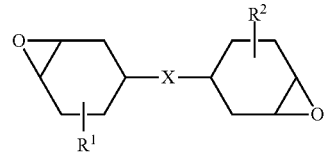

wherein $R^1$ and $R^2$ are independently of each other a linear or branched alkyl group having 1 to 5 carbon atoms, and X is a direct bond; a carbonyl group; a carbonate group; an ether group; a thioether group; an ester group; an amide group; a linear or branched alkylene group, alkylidene group, or alkoxylene group having 1 to 18 carbon atoms; a cycloalkylene group or cycloalkylidene group having 1 to 6 carbon atoms; or a connecting group thereof.

In the present specification, a "direct bond" refers to a structure which is directly bonded without other functional groups. For example, in Chemical Formula 1, the direct bond refers to two cyclohexanes directly connected to each other. In addition, in the present invention, a "connecting group" refers to two or more substituents described above being connected to each other.

In addition, in Chemical Formula 1, the substitution positions of $R^1$ and $R^2$ are not particularly limited, but when the carbon connected to X is set at position 1, and the carbons connected to an epoxy group are set at positions 3 and 4, it is preferred that $R^1$ and $R^2$ are substituted at position 6.

The compound described above includes a cyclic epoxy structure in the molecule, and when the epoxy structure is formed in a linear shape as in Chemical Formula 1, the viscosity of the composition may be lowered to an appropriate range. When the viscosity is lowered, the coatability of the composition is improved and also the reactivity of the epoxy group is further improved, thereby promoting the curing reaction. In addition, crosslinks with the epoxy siloxane resin is formed to improve the hardness of the hard coating layer.

The content of the crosslinking agent according to the present invention is not particularly limited, and for example, may be 5 to 150 parts by weight, based on 100 parts by weight of the epoxy siloxane resin. When the content of the crosslinking agent is within the above range, the viscosity of the composition for forming a hard coating layer may be maintained in a more appropriate range, and coatability and curing reactivity may be further improved.

In addition, the crosslinking agent may be included at 3 to 30 parts by weight, based on 100 parts by weight of the entire composition. More preferably, the crosslinking agent may be included at 5 to 20 parts by weight, based on 100 parts by weight of the entire composition.

In some exemplary embodiments, the composition for forming a hard coating layer may further include a photoinitiator or a thermal initiator.

According to some exemplary embodiment, the photoinitiator may include a photo-cationic initiator. The photo-cationic initiator may initiate polymerization of the epoxy siloxane resin and an epoxy-based monomer.

As the photo-cationic initiator, for example, an onium salt and/or an organic metal salt may be used, but not limited thereto. For example, a diaryliodonium salt, a triarylsulfonium salt, an aryldiazonium salt, an iron-arene complex, and the like may be used. These may be used alone or in combination of two or more.

The content of the photoinitiator is not particularly limited, but for example, the photoinitiator may be included at 0.1 to 15 parts by weight, and more preferably 1 to 15 parts by weight, based on 100 parts by weight of the epoxy siloxane resin. When the content of the photoinitiator is within the above range, excellent curing efficiency of the composition for forming a hard coating layer may be maintained, and deterioration of the physical properties due to residual components after curing may be prevented.

In addition, for example, the photoinitiator may be included at 0.01 to 10 parts by weight, based on 100 parts by weight of the entire composition. More preferably, the photoinitiator may be included at 0.1 to 10 parts by weight, and still more preferably 0.3 to 5 parts by weight, based on 100 parts by weight of the entire composition.

The thermal initiator may promote the crosslinking reaction of the epoxy siloxane resin or the crosslinking agent when heat is applied to the composition for forming a hard coating layer.

As the thermal initiator, a cationic thermal initiator may be used, but not limited thereto.

In the exemplary embodiments, the thermal initiator may include a compound represented by the following Chemical Formula 2. The compound of the following Chemical Formula 2 may act as, for example, a cationic thermal initiator. When the compound of the following Chemical Formula 2 is used as the thermal initiator, the curing half-life may be shortened. Accordingly, the thermal curing may be performed rapidly even under the low-temperature conditions, thereby preventing damage and deformation which occur in the case of long-term heat treatment under the high-temperature conditions.

[Chemical Formula 2]

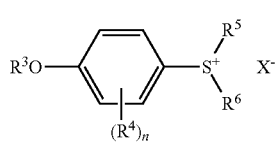

wherein $R^3$ is hydrogen, an alkoxycarbonyl group having 1 to 4 carbon atoms, an alkylcarbonyl group having 1 to 4 carbon atoms, or an arylcarbonyl group having 6 to 14 carbon atoms, $R^4$ is independently of each other hydrogen, halogen, or an alkyl group having 1 to 4 carbon atoms, n is 1 to 4, $R^5$ is an alkyl group having 1 to 4 carbon atoms or an aralkyl group having 7 to 15 carbon atoms which may be substituted by an alkyl group having 1 to 4 carbon atoms, $R^6$ is an alkyl group having 1 to 4 carbon atoms, and X is $SbF_6$, $PF_6$, $AsF_6$, $BF_4$, $CF_3SO_3$, $N(CF_3SO_2)_2$, or $N(C_6F_5)_4$.

The alkoxy portion of the alkoxycarbonyl group has 1 to 4 carbon atoms, and examples of the alkoxycarbonyl group may include a methoxycarbonyl group, an ethoxycarbonyl group, a propoxycarbonyl group, and the like.

The alkyl portion of the alkylcarbonyl group has 1 to 4 carbon atoms, and examples of the alkylcarbonyl group may include an acetyl group, a propionyl group, and the like.

The aryl portion of the arylcarbonyl group has 6 to 14 carbon atoms, and examples of the arylcarbonyl group may include a benzoyl group, a 1-naphthylcarbonyl group, 2-naphthylcarbonyl group, and the like.

Examples of the aralkyl group may include a benzyl group, a 2-phenylethyl group, a 1-naphthylmethyl group, a 2-naphthylmethyl group, and the like.

In some exemplary embodiments, the thermal initiator may be included at 0.1 to 20 parts by weight, and more preferably 2 to 20 parts by weight, based on 100 parts by weight of the epoxy siloxane resin. When the content of the thermal initiator is within the above range, a thermal curing reaction may proceed at an efficient speed, and the contents of other components of the composition are decreased to prevent the mechanical properties (for example, hardness, flexibility, a curling property, and the like) of the hard coating layer from being deteriorated.

In addition, for example, the thermal initiator may be included at 0.01 to 15 parts by weight, based on 100 parts by weight of the entire composition. More preferably, the thermal initiator may be included at 0.2 to 15 parts by weight, and still more preferably 0.5 to 10 parts by weight, based on 100 parts by weight of the entire composition.

In some exemplary embodiments, photocuring using the photoinitiator and thermal curing using the thermal initiator are used in combination, whereby the curing degree, hardness, flexibility, anti-curling property, and the like of the hard coating layer may be improved, and the refractive index may be adjusted.

For example, the composition for forming a hard coating layer may be applied to a substrate or the like and be irradiated with ultraviolet rays (photocuring) to at least partially cure the composition, and then heat may be applied (thermal curing) to substantially completely cure the composition.

That is, the composition for forming a hard coating layer may be semi-cured or partially cured by the photocuring. The semi-cured or partially cured composition for forming a hard coating layer may be substantially completely cured by the thermal curing.

For example, when the composition for forming a hard coating layer is cured only by the photocuring, a curing time is excessively extended, or in part, curing may not be completely performed. However, when the photocuring is followed by the thermal curing, the portion which is not cured by the photocuring may be substantially completely cured by the thermal curing, and the curing time may also be reduced.

In addition, generally, a portion which has been already appropriately cured is provided with excessive energy due to an increase in the curing time (for example, an increase in light exposure time), whereby overcuring may occur. When the overcuring proceeds, the hard coating layer loses flexibility or mechanical defects such as curls or cracks may occur. However, the photocuring and the thermal curing are used in combination, the composition for forming a hard coating layer may be substantially completely cured within a short time. Thus, the hardness may be improved and occurrence of curling may be suppressed, while the flexibility of the hard coating layer is maintained.

In some exemplary embodiments, the thermal curing may first proceed and then the photocuring may proceed.

In some exemplary embodiments, the composition for forming a hard coating layer may further include a solvent. The solvent is not particularly limited and a solvent known in the art may be used.

Non-limiting examples of the solvent may include alcohol-based solvents (such as methanol, ethanol, isopropanol, butanol, methyl cellosolve, and ethyl cellosolve), ketone-based solvents (such as methyl ethyl ketone, methyl butyl ketone, methyl isobutyl ketone, diethyl ketone, dipropyl ketone, and cyclohexanone), hexane-based solvents (such as hexane, heptane, and octane), benzene-based solvents (such as benzene, toluene, and xylene), and the like. These may be used alone or in combination of two or more.

The content of the solvent is not particularly limited, and for example, may be 10 to 200 parts by weight, based on 100 parts by weight of the epoxy siloxane resin. When the above range is satisfied, the composition for forming a hard coating layer secures an appropriate level of viscosity, so that workability at the time of forming the hard coating layer may be better. In addition, it is easy to control the thickness of the hard coating layer, and the solvent drying time is reduced, whereby a more rapid process speed may be secured.

In addition, for example, the solvent may be included at a residual amount excluding the amount of the remaining components in the total weight of the predetermined entire composition. For example, when the total weight of the predetermined entire composition is 100 g and the sum of the weights of the remaining components excluding the solvent is 70 g, 30 g of the solvent may be included.

In some exemplary embodiments, the composition for forming a hard coating layer may further include additives such as an inorganic filler, a lubricant, an antioxidant, a UV absorber, a photostabilizer, a thermal polymerization inhibitor, a leveling agent, a surfactant, and an antifouling agent. The inorganic filler may improve the hardness of the hard coating layer.

In some exemplary embodiments, the content ratios of the constituents of the composition for forming a hard coating layer may be adjusted, so that the refractive index of the hard coating layer is 1.49 to 1.54. Accordingly, a difference in the refractive index between the hard coating layer and the polyamideimide substrate layer may be decreased, and a hard coating film in which an interference fringe is effectively suppressed may be formed.

The thickness of the hard coating layer 110 is not particularly limited, and for example, may be 5 to 100 μm, and more preferably 5 to 50 μm. When the thickness of the hard coating layer 110 is within the range, the hard coating layer may maintain optical properties, while having excellent hardness.

The exemplary embodiments of the present invention provide a preparation method of a hard coating film 10.

In the exemplary embodiments, a preparation method of the hard coating film 10 includes: forming a polyamideimide substrate layer 100 having a refractive index of 1.51 to 1.57; and forming a hard coating layer 110 having a refractive index of 1.49 to 1.54 on at least one surface of the substrate layer 100, a difference in the refractive index between the substrate layer 100 and the hard coating layer 110 being 0.05 or less, wherein the substrate layer has a tensile modulus of 7 GPa or less, at a thickness of 80 μm, as measured according to ASTM D111.

As the substrate layer 100 and the hard coating layer 110 have predetermined refractive indexes, respectively, and a difference in the refractive index therebetween is 0.05 or less, occurrence of the interference fringe of the hard coating film may be effectively suppressed. In addition, the substrate layer 100 having a tensile modulus of 7 GPa or less may support the hard coating layer 110 flexibly to improve the pencil hardness of the hard coating film 10.

The substrate layer 100 may include the polyamideimide resin, and the polyamideimide resin may be formed from the composition for forming polyamideimide described above. In addition, the contents of the compounds (a) to (c) of the composition for forming polyamideimide may be adjusted to adjust the refractive index and the tensile modulus of the substrate layer 100 to a desired range.

The composition for forming a substrate layer may include the polyamideimide resin and a solvent. The polyamideimide resin may be dissolved in the solvent.

The solvent may include, for example, N,N-dimethylacetamide (DMAc), but is not limited thereto.

In some exemplary embodiments, the composition for forming a substrate layer is applied on the substrate and dried to form the substrate layer 100. As the substrate, for example, glass may be used, but is not limited thereto.

The application may be performed by a die coater, an air knife, a reverse roll, spray, a blade, casting, gravure, spin coating, and the like.

The composition for forming a hard coating layer described above is applied on the upper surface or the lower surface of the substrate layer 100 and is dried to form the hard coating layer 110.

In the exemplary embodiments, curing of the composition for forming a hard coating layer may be performed by photocuring or thermal curing, and a method known in the art may be used.

According to some exemplary embodiments, the applied composition for forming a hard coating layer may be irradiated with ultraviolet rays. The composition for forming a hard coating layer may be at least partially photocured by the ultraviolet irradiation.

In the exemplary embodiments, the ultraviolet irradiation may be performed so that a curing degree of the composition for forming a hard coating layer is about 20 to 80%. When the curing degree is within the range, the hard coating layer is primarily cured to secure hardness, and simultaneously prevents an overcuring phenomenon due to an extended light exposure time.

For example, the ultraviolet irradiation may be performed so that the pencil hardness of the cured hard coating layer is 1H or less. That is to say, the ultraviolet irradiation is finished before the pencil hardness of the hard coating layer becomes about 1H, and thermal curing may be performed.

In the exemplary embodiments, the composition for forming a hard coating layer irradiated with ultraviolet rays may be thermally cured to form the hard coating layer 110.

For example, heat may be applied to the hard coating layer composition which has been primarily partially cured by ultraviolet irradiation to substantially completely cure the composition. When the photocuring and the thermal curing having different curing mechanisms are used in combination, the curing time is shortened as compared with the case in which the photocuring or the thermal curing is carried out alone, respectively for curing, thereby suppressing an overcuring phenomenon. In addition, the crosslinking reaction is effectively derived to allow the crosslinks to be uniformly formed. In addition, optical properties may be maintained, while the hardness of the hard coating layer 110 is improved.

In some exemplary embodiments, the thermal curing may be performed at a temperature of 100 to 200° C. for 5 to 20 minutes. More preferably, the thermal curing may be performed at a temperature of 120 to 180° C. Within the temperature range, the thermal curing may proceed at an effective speed. In addition, thermal decomposition or a side reaction of each component in the composition for forming a hard coating layer or overcuring of the hard coating layer which causes an excessive increase in the refractive index, may be effectively prevented.

According to the exemplary embodiments, pretreatment may be carried out by heating the composition for forming a hard coating layer before ultraviolet irradiation. In the pretreatment process, a solvent having high volatility may be evaporated before ultraviolet irradiation. Thus, occurrence of air bubbles or non-uniform curing during ultraviolet irradiation may be prevented.

The pretreatment may be carried out at lower temperature than the thermal curing temperature, and for example, may be carried out at 40 to 80° C. Within the temperature range, the solvent may be effectively evaporated while the initiation reaction of the thermal initiator does not occur.

In some exemplary embodiments, the hard coating film 10 has a high surface hardness and excellent flexibility and is lighter and has better impact resistance than a tempered glass, and thus, may be preferably used as a window substrate of the outermost surface of the display panel.

According to some exemplary embodiments, an image display including the hard coating film 10 may be provided.

The hard coating film 10 may be used as the outermost surface window substrate of the image display. The image display may be various image displays such as a common liquid crystal display, an electroluminescence display, a plasma display, and a field emission display.

Hereinafter, preferred examples will be provided in order to assist in the understanding of the present invention. However, it will be obvious to those skilled in the art that these examples only illustrate the present invention and do not limit the appended claims, and various modifications and alterations of the examples may be made within the range of the scope and spirit of the present invention, and these modifications and alterations will fall within the appended claims.

Preparation Example

Preparation of Polyamideimide Substrate Layer Films A-1 to A-6

N,N-dimethylacetamide (DMAc) and 2,2'-bis(trifluoromethyl)benzidine (TFMB) were added to a reactor under a nitrogen atmosphere and were sufficiently stirred, and 4,4'-(hexafluoroisopropylidene)diphthalic anhydride (6FDA) was added thereto and the materials were sufficiently stirred until they were dissolved. Thereafter, cyclobutanetetracarboxylic dianhydride (CBDA) was added and sufficiently stirred until the material was dissolved. Thereafter, terephthaloyl dichloride (TPC) and isoterephthaloyl dichloride (IPC) were added and the materials were stirred for 6 hours to be dissolved and reacted, thereby preparing a polyamic acid resin composition. Each monomer was used at the mole ratio shown in the following Table 1, and the amounts thereof were adjusted to 6.5 wt % based on the solid content. Pyridine and acetic anhydride were added to the composition at 2.5-fold of the moles of the total dianhydrides and were stirred at 60° C. for 1 hour. Thereafter, the solution was precipitated in an excessive amount of methanol and the precipitate was filtered to obtain a solid content, which was dried under vacuum at 50° C. for 6 hours to obtain polyamideimide powder. The powder was diluted and dissolved at 20% in DMAc to prepare a composition for forming a substrate layer.

The composition for forming a substrate layer was cast on a glass substrate to form a polyamideimide substrate layer film, which was then separated from the substrate. The thickness of the polyamideimide substrate layer film was 80 μm and the refractive index and the tensile modulus as measured according to ASTM D111 were as shown in the following Table 1:

TABLE 1

| Classification | TFMB | 6FDA | CBDA | IPC | TPC | Refractive index | Tensile modulus (GPa) |
| --- | --- | --- | --- | --- | --- | --- | --- |
| A-1 | 100 | 10 | 10 | 10 | 70 | 1.53 | 6.1 |
| A-2 | 100 | 10 | 25 | 15 | 50 | 1.55 | 6.1 |
| A-3 | 100 | 5 | 45 | 10 | 40 | 1.57 | 6.1 |
| A-4 | 100 | 5 | 5 | — | 90 | 1.54 | 2.5 |
| A-5 | 100 | 5 | 60 | 5 | 30 | 1.50 | 2.9 |
| A-6 | 100 | 20 | 30 | 5 | 45 | 1.58 | 7.5 |

Preparation of Polyimide Substrate Layer Film A-7

A 500 ml reactor equipped with a stirrer, a nitrogen injection apparatus, a dropping funnel, a thermostat, and a cooler was filled with 397.603 g of N,N-dimethylacetamide (DMAc) while passing nitrogen through the reactor, and then 46.130 g of 9,9-bis(4-amino-3-fluorophenyl)fluorene (FFDA) was dissolved. Thereafter, 35.306 g of 4,4'-biphenyltetracarboxylic dianhydride (BPDA) was added thereto, the temperature of the solution was maintained at room temperature, and the reaction was performed for 18 hours to obtain a polyamic acid solution having a solid content concentration of 17 wt %.

The thus-obtained solution was cast on a glass substrate, dried by hot air at 80° C. for 20 minutes, at 120° C. for 20 minutes, and by isothermal hot air at 290° C. for 30 minutes, and then slowly cooled to separate the film from the substrate, thereby preparing a polyimide substrate layer film having a thickness of 80 μm, a refractive index of 1.61, and a tensile modulus of 2.8.

Preparation of Composition B-1 for Forming Hard Coating Layer 2-(3,4-epoxycyclohexyl)ethyltrimethoxysilane (ECTMS, TCI Co., Ltd.) and water (H$_2$O, Sigma-Aldrich Corporation) were mixed at a ratio of 24.64 g:2.70 g (0.1 mol:0.15 mol) to prepare a reaction solution and the reaction solution was added to a 250 mL 2-neck flask. 0.1 mL of a tetramethylammonium hydroxide catalyst (Sigma-Aldrich Corporation) and 100 mL of tetrahydrofuran (Sigma-Aldrich Corporation) were added to the mixture and stirred at 25° C. for 36 hours. Thereafter, layer separation was performed and a product layer was extracted with methylene chloride (Sigma-Aldrich Corporation), and moisture was removed from the extract with magnesium sulfate (Sigma-Aldrich Corporation) and the solvent was dried under vacuum to obtain an epoxy siloxane resin. As a result of measuring the epoxy siloxane resin using gel permeation chromatography (GPC), the weight average molecular weight was 2500.

A composition for forming a hard coating layer including parts by weight of the epoxy siloxane resin, 15 parts by weight of a 2-(3',4'-epoxycyclohexyl)ethyl 3,4-epoxycyclohexyl carboxylate crosslinking agent, 0.5 parts by weight of a (4-methylphenyl)[4-(2-methylpropyl)phenyl]iodonium hexafluorophosphate photoinitiator, and 54.5 parts by weight of a methylethylketone solvent, was prepared.

Preparation of Composition B-2 for Forming Hard Coating Layer

A composition for forming a hard coating layer was prepared in the same manner as in composition B-1, except that an epoxy siloxane resin formed by reacting 2-(3,4-epoxycyclohexyl)ethyltrimethoxysilane (ECTMS, TCI Co., Ltd.), trimethoxyphenylsilane (IMPS, TCI Co., Ltd.), and water ($H_2O$) at a ratio of 12.32 g:9.9 g:2.70 g (0.05 mol:0.05 mol:0.15 mol), was used as the epoxy siloxane resin.

Preparation of Composition B-3 for Forming Hard Coating Layer

A composition for forming a hard coating layer was prepared in the same manner as in composition B-1, except that a mixture of 15 parts by weight of the epoxy siloxane resin of B-1 and 15 parts by weight of the epoxy siloxane resin of B-2 were used as the epoxy siloxane resin.

Preparation of Composition B-4 for Forming Hard Coating Layer 20 parts by weight of decafunctional urethane acrylate (SC2153, Miwon Specialty Chemical Co., Ltd), 30 parts by weight of titanium oxide (solid content of 30%, diameter of 20 nm), 1 part by weight of 1-hydroxycyclohexyl phenyl ketone, and 49 parts by weight of methyl ethyl ketone (Sigma-Aldrich Corporation) were mixed to prepare a hard coating composition.

Preparation of Composition B-5 for Forming Hard Coating Layer 10 parts by weight of decafunctional urethane acrylate (SC2153, Miwon Specialty Chemical Co., Ltd), 40 parts by weight of zirconium oxide (solid content of 30%, diameter of 20 nm), 1 part by weight of 1-hydroxycyclohexyl phenyl ketone, and 49 parts by weight of methyl ethyl ketone (Sigma-Aldrich Corporation) were mixed to prepare a hard coating composition.

Examples and Comparative Examples

Compositions B-1 to B-5 for forming a hard coating layer were applied on substrate layer films A-1 to A-7 using a Meyer bar and were cured at 60° C. for 5 minutes. Thereafter, the compositions were irradiated with UV rays at 1 J/cm² using a high-pressure metal lamp and cured at 120° C. for 15 minutes to prepare a hard coating film on which a hard coating layer having a thickness of 10 μm was formed.

Experimental Example

The refractive index of the hard coating layer, the difference in the refractive index between the hard coating layer and the substrate layer, and the pencil hardness and the interference fringe of the entire hard coating film were measured and are shown in the following Table 2.

1. Measurement of Pencil Hardness

A pencil hardness on the surface of a hard coating layer of a hard coating film was measured using pencils by hardness (Mitsubishi Pencil Co., Ltd.) under a load of 1 kg using a pencil hardness tester (Kipae E&T Co. Ltd.) in accordance with ASTM D3363.

2. Measurement of Yellow Index (YI)

A hard coating film having a size of 50 mm×50 mm was sampled and YI was measured using a spectrophotometer (Nippon Denshoku Industries, Co., Ltd. COH-7700). The higher the YI value is, the more yellow the film may be, and it was found that the hard coating film is inappropriate for being used as an optical film.

3. Evaluation of Interference Fringe

A black plastic plate (2 mm, made of PMMA) was joined to a surface on which the hard coating layer of the hard coating film was not formed. In a dark room, the surface of the hard coating film to which the black plastic plate was joined was irradiated with light with an interference fringe inspector (Funatech Co., Ltd, FNA-35, light source 35 W Na Lamp) and the photographs of the interference fringe were taken while the interference fringe was visually observed.

Figure 2:
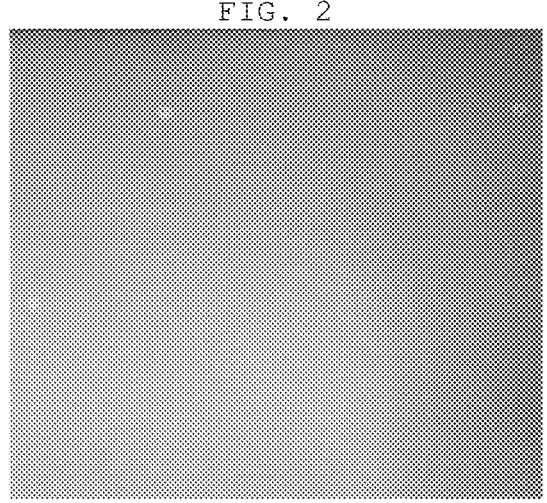
FIGS. 2 to 4 correspond to photographs of an interference fringe of the hard coating film.
Figure 3:
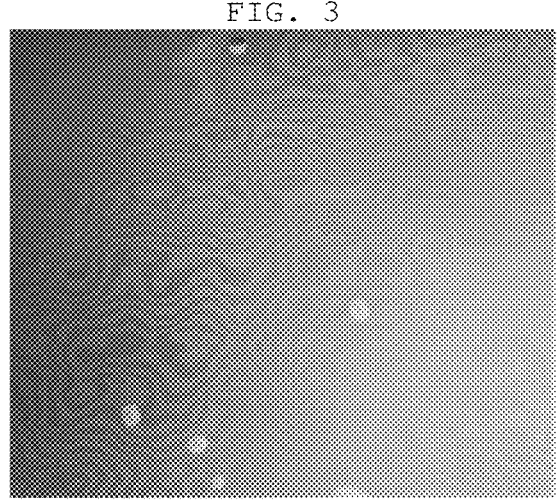
Figure 4:
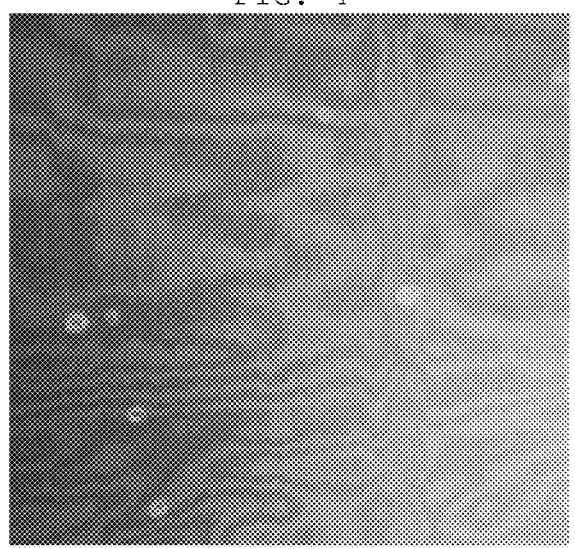

FIGS. 2 to 4 show the taken photographs.

FIG. 2 shows a hard coating film on which the interference fringe was not substantially viewed.

The evaluation criteria were as follows:
⊚: an interference fringe was not viewed, FIG. 2.
○: an interference fringe was partially viewed, FIG. 3.
x: an interference fringe was strongly viewed, FIG. 4.

TABLE 2

| Classification | Substrate layer | Composition for forming hard coating layer | Refractive index of substrate layer | Refractive index of hard coating layer | Difference in refractive index | Pencil hardness of hard coating film | YI | Interference fringe |
|---|---|---|---|---|---|---|---|---|
| Example 1 | A-1 | B-1 | 1.53 | 1.52 | 0.01 | 6H | 2.57 | ⊚ |
| Example 2 | A-1 | B-3 | 1.53 | 1.53 | 0 | 6H | 2.58 | ⊚ |
| Example 3 | A-2 | B-1 | 1.55 | 1.52 | 0.03 | 6H | 2.79 | ○ |
| Example 4 | A-2 | B-3 | 1.55 | 1.53 | 0.02 | 6H | 2.77 | ⊚ |
| Example 5 | A-3 | B-1 | 1.57 | 1.52 | 0.05 | 6H | 2.99 | ○ |
| Example 6 | A-3 | B-2 | 1.57 | 1.54 | 0.03 | 5H | 2.98 | ○ |
| Example 7 | A-1 | B-5 | 1.53 | 1.56 | 0.03 | 5H | 2.60 | ○ |
| Comp. Ex. 1 | A-4 | B-1 | 1.54 | 1.52 | 0.02 | 2H | 2.68 | X |
| Comp. Ex. 2 | A-5 | B-1 | 1.50 | 1.52 | 0.02 | 2H | 2.31 | X |
| Comp. Ex. 3 | A-6 | B-2 | 1.58 | 1.54 | 0.04 | 3H | 3.22 | ○ |
| Comp. Ex. 4 | A-6 | B-1 | 1.58 | 1.52 | 0.06 | 3H | 3.24 | X |
| Comp. Ex. 5 | A-7 | B-2 | 1.61 | 1.52 | 0.09 | 3H | 3.72 | X |
| Comp. Ex. 6 | A-1 | B-4 | 1.53 | 1.62 | 0.09 | 3H | 2.57 | X |

Referring to the above Table 2, it was found that the hard coating films of the Examples had the pencil hardness, the yellow index, and the interference fringe properties which were improved as compared with those of the Comparative Examples.

According to the exemplary embodiments of the present invention, a polyamideimide substrate layer and a hard coating layer, each of which has a predetermined refractive index, are laminated, and a difference in the refractive index between the substrate layer and the hard coating layer is 0.05 or less. In addition, the substrate layer has a tensile modulus in a specific range. Accordingly, occurrence of an interference fringe due to an optical difference between the layers of the hard coating film may be suppressed. In addition, a pencil hardness of the hard coating film may be improved.

According to the exemplary embodiments, as the substrate is formed of polyamideimide, excellent optical and mechanical properties (for example, a modulus of elasticity) may be secured.

In addition, since a yellow index of the substrate layer is 3 or less, a substantially colorless optical film may be provided.

According to the exemplary embodiments, the hard coating layer may be formed of an epoxysilane resin. Accordingly, mechanical strength of the hard coating film may be improved.

What is claimed is:

1. A hard coating film comprising:
a polyamideimide substrate layer having a refractive index of 1.51 to 1.57; and
a hard coating layer having a refractive index of 1.49 to 1.54, disposed on at least one surface of the substrate layer, wherein
the substrate layer has a tensile modulus of 3 to 7 GPa, at a thickness of 80 μm, as measured according to ASTM D111, and
a difference in the refractive index between the substrate layer and the hard coating layer is 0.05 or less.

2. The hard coating film of claim 1, wherein the substrate layer has a light transmittance at 388 nm of 75% or less.

3. The hard coating film of claim 1, wherein the substrate layer has a yellow index of 3 or less, at the thickness of 80 μm.

4. The hard coating film of claim 1, wherein the difference in the refractive index is 0.02 or less.

5. The hard coating film of claim 1, wherein the substrate layer includes a polyamideimide resin formed by copolymerizing (a) an aromatic diamine compound, (b) a dianhydride compound, and (c) an aromatic dicarboxylic acid compound or a derivative thereof.

6. The hard coating film of claim 5, wherein the (a) aromatic diamine compound includes a fluorine-substituted aromatic diamine compound.

7. The hard coating film of claim 5, wherein the (b) dianhydride compound includes a dianhydride compound containing an aromatic ring and a dianhydride compound containing an aliphatic ring.

8. The hard coating film of claim 5, wherein the (c) aromatic dicarboxylic acid compound or the derivative thereof includes a terephthaloyl dichloride or isoterephthaloyl dichloride.

9. The hard coating film of claim 1, wherein the hard coating layer includes an epoxysilane resin.

10. The hard coating film of claim 9, wherein the epoxysilane resin includes a cured product of 2-(3,4-epoxycyclohexyl)ethyltrimethoxysilane.

11. The hard coating film of claim 9, wherein the epoxysilane resin includes a cured product of 2-(3,4-epoxycyclohexyl)ethyltrimethoxysilane and trimethoxyphenylsilane.

* * * * *